United States Patent [19]

Rampel

[11] 3,954,501

[45] May 4, 1976

[54] RECHARGEABLE ELECTRODES UTILIZING UNSINTERED FLUOROCARBON BINDER

[76] Inventor: Guy Rampel, 1319 NW. 7th Ave., Gainesville, Fla. 32601

[22] Filed: Apr. 28, 1975

[21] Appl. No.: 572,321

Related U.S. Application Data

[60] Continuation of Ser. No. 432,318, Jan. 10, 1974, abandoned, which is a continuation of Ser. No. 131,427, April 5, 1971, abandoned, which is a division of Ser. No. 742,156, July 13, 1968, Pat. No. 3,630,781.

[52] U.S. Cl. .................................. 136/24; 136/75; 136/120 R
[51] Int. Cl.$^2$ ...................................... H01M 35/02
[58] Field of Search ........ 136/120 R, 120 FC, 86 D, 136/24, 20, 28–29, 30, 31, 75, 9

[56] References Cited
UNITED STATES PATENTS

| | | | |
|---|---|---|---|
| 3,060,254 | 10/1962 | Urry | 136/24 |
| 3,385,736 | 5/1968 | Deibert | 136/120 FC |
| 3,407,096 | 10/1968 | Landi | 136/120 FC X |
| 3,438,815 | 4/1969 | Giner | 136/120 FC X |

*Primary Examiner*—Anthony Skapars
*Attorney, Agent, or Firm*—Dennis A. Dearing; Donald J. Voss; Frank H. Neuhauser

[57] ABSTRACT

Polytetrafluoroethylene in aqueous dispersion is mixed with a finely divided electrochemically active rechargeable electrode material, such as zinc, zinc oxide, cadmium, cadmium oxide, nickel oxide, copper, copper oxide, silver, silver oxide, mercuric oxide, etc. The dispersion is broken by drying, freezing, solvent extraction, etc. Where zinc particles form the active material it may be desirable to amalgamate the zinc with mercury.

9 Claims, No Drawings

RECHARGEABLE ELECTRODES UTILIZING UNSINTERED FLUOROCARBON BINDER

BACKGROUND OF THE INVENTION

This is a continuation of patent application Ser. No. 432,318, filed Jan. 10, 1974, now abandoned. Patent application Ser. No. 432,318 is a continuation of patent application Ser. No. 131,427, filed Apr. 5, 1971 and now abandoned. Patent application Ser. No. 131,427 is a division of U.S. Pat. application Ser. No. 742,156, now U.S. Pat. No. 3,630,781, filed July 13, 1968 and patented Dec. 28, 1971.

My invention relates to novel rechargeable electrodes and to processes for their manufacture.

Linear fluorocarbon polymers have been extensively utilized as binders and wet proofing agents in cell electrodes having finely divided active material. According to a typical electrode forming technique a fluorocarbon polymer may be incorporated in a cell plate by mixing the polymer with a particulate active material to form an aqueous paste. Since fluorocarbons are hydrophobic, this is accomplished by first dispersing the fluorocarbon in an aqueous solution containing a minor amount of a surface active agent, usually less than 5 percent by weight. The surfactant allows the polymer to be uniformly dispersed in the water, so that in the pasty mixture of water, surfactant, active material particles, and polymer, the latter is uniformly distributed. The aqueous paste is spread onto a current collector to form a cell plate, and the cell plate is then heated to drive off the water. After drying is complete, the cell plate is then heated to a temperature at or near which the polymer melts. This performs the dual functions of decomposing the surfactant to drive it from the cell plate and sintering the polymer to give it a permanent set.

In a variant technique, also commonly practiced in forming electrodes, the active material may be first associated with the current collector (which itself may act to hold the electrode into a coherent body) and the body then impregnated with an aqueous dispersion of the fluorocarbon polymer. Drying and sintering are accomplished in the same manner.

SUMMARY OF THE INVENTION

It is an object of my invention to provide a novel rechargeable electrode containing a linear fluorocarbon polymer which electrode exhibits increased capacity and extended charge and discharge cycle life.

It is another object to provide a novel rechargeable electrode which more efficiently consumes a reactive gas generated within a sealed cell by a counter electrode during overcharge.

It is still another object to provide a process for the manufacture of my rechargeable electrodes.

In one aspect my invention is directed to a process of forming a rechargeable electrode comprising associating a current collector with a finely divided active rechargeable electrode material. The active material is intimately associated with a dispersion comprised of a fibrous linear hydrophobic fluorocarbon polymer minutely distributed within a liquid carrier. The dispersion is irreversibly broken at a temperature below the sintering temperature of the fluorocarbon polymer to provide a fibrous interconnecting matrix of the linear polymer forming with the active rechargeable electrode material a cohesive body in which the active rechargeable electrode material remains highly accessible to both gas and electrolyte contact.

Additionally, my invention is directed to a rechargeable electrode which in one form is comprised of finely divided active rechargeable material and a current collector improved by the finely divided active rechargeable material forming a cohesive body with a fibrous interconnecting network of a water insoluble hydrophobic linear fluorocarbon polymer. Description of the Preferred Embodiments According to my invention a linear fluorocarbon polymer is incorporated into a rechargeable electrode. As used herein the term "fluorocarbon" denotes a hydrocarbon polymer having one or more of the hydrogen atoms substituted by fluorine atoms. Exemplary fluorocarbon polymers suitable for the practice of my invention include polyvinylidene fluoride, polychlorotrifluoroethylene, polyhexafluoropropylene, polytetrafluoroethylene (hereinafter designated PTFE), and copolymer variations thereof. These polymers are highly hydrophobic. All have a critical surface tension less than the surface tension of water. A generally preferred class of fluorocarbon polymers are those having a critical surface tension less than 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publishing Corporation, New York, 1962. Preferably the fluorocarbon polymer should be a solid--i.e. exhibit a molecular weight of at least 10,000 and preferably 20,000.

According to a conventional practice I utilize the fluorocarbon polymer dispersed in a liquid carrier. The liquid carrier is preferably water, although any conventional carrier capable of minutely dispersing the polymer may be employed. Generally dispersion to the colloidal level is preferred. This may be accomplished by high speed blending of the carrier surfactant and polymer by conventional techniques and does not per se form a part of my invention. Since fluorocarbon polymers are hydrophobic, it is necessary to add a surfactant for surface wetting in order to maintain the dispersion of these polymers in water. Any conventional surfactant may be utilized for this purpose, including soaps and detergents. Exemplary suitable surfactants include such materials as alkylphenol polyethylene oxide, aliphatic and aromatic sulfonates, amine salts, etc. Neither the proportion of surfactant nor carrier is critical. Typically the surfactant is employed in the minimum amount sufficient to disperse the fluorocarbon polymer, usually less than 5 percent by weight, based on the weight of the polymer. The proportion of carrier is chosen purely on the basis of convenience.

Since fluorocarbon polymers are highly chemically inert, they may be utilized in rechargeable electrodes incorporating any conventional active rechargeable electrode material. It is merely necessary that the material be available in solid, particulate form. Exemplary active rechargeable electrode materials available in finely particulate form are zinc, zinc oxide, cadmium, cadmium oxide, nickel oxide, copper, copper oxide, silver, silver oxide, mercuric oxide, etc.

According to one general approach the carrier, fluorocarbon polymer, surfactant, and particulate active rechargeable material may be mixed to form a paste. Typically the proportions are chosen to bring the desired loading of fluorocarbon polymer into contact with the active rechargeable material while supplying just enough carrier to yield a pasty easily kneaded composition. I have observed that polymer proportions ranging from 0.5 to 25 percent by weight, or higher, based on the combined weight of fluorocarbon polymer and active material, may be successfully utilized. Polymer contents of less than 0.5 percent are usually too low to reliably bond the active material for pasted electrode construction. Proportions of polymer above 25 percent are usually avoided, since excess proportions of polymer displace active material without compensating enhancement in electrode performance. I prefer to utilize from 1 to 15 percent by weight polymer. In comparing electrodes formed according to my invention having polymer proportions above 2.5 percent by weight, based on the combined weight of polymer and active material, with electrodes made by conventional sintering techniques having comparable proportions of polymer, I have noted that with polymer proportions above this level electrodes formed according to my invention exhibit a significantly lower degree of active material masking, as is reflected in superior performance characteristics.

After the paste is formed it is subjected to treatment to separate the carrier and polymer so that the polymer is precipitated in the paste as an interconnected fibrous matrix. This may be accomplished in any one of a variety of ways. According to one approach the carrier is transformed from the liquid phase as by freezing or volatilizing. Where water is the carrier the simplest approach is to remove the carrier by drying of the paste. To speed drying the paste is preferably heated, but the temperature level is maintained below the sintering temperature of the polymer. With the carrier driven off as water vapor the polymer fibers are left within the paste to act as a binder. When the carrier is frozen, water separates from the dispersion as ice crystals leaving the polymer fibers. Upon thawing the dispersion does not reform, but the fibers are left in place. Alternatively to freezing or drying the carrier may be separated from the polymer dispersion merely by increasing the pH of the carrier, as by introducing an alkaline reagent. This again breaks the dispersion and deposits the polymer in a fibrous form. By still another technique the carrier may be removed by solvent extraction. For example, where water is the carrier, it may be removed from the paste by repeatedly contacting the paste with a lower molecular weight alkanol, such as methanol, propanol, etc.

Where a surfactant or similar dispersing agent has been used to suspend the polymeric binder in the liquid carrier, it is usually preferred, although not essential, to remove this material prior to forming a cell plate. The purpose of removing the surfactant is to render the plates as nearly invariant as possible in cell use, so that variations in electrical properties upon repeated charge and discharge of the cell plates or after prolonged standing will exhibit only a minimal change. Since the initial polymer dispersion, once broken, cannot be regenerated merely by reintroduction of the carrier, a convenient technique for removing the surfactant is to rinse the paste with water or other suitable liquid carrier in which the surfactant is soluble. Usually it is desirable to repeatedly rinse and simultaneously knead the paste to extract the surfactant.

The remaining coherent paste comprised of fibrous fluorocarbon polymer and particulate rechargeable active material may be spread onto a conventional current collector or other support by well understood techniques. Usually the paste is spread with a doctor blade or by calendering so that the paste is uniformly distributed over the desired active area of the cell plate. Typically expanded metal, woven screens, or porous plaques of electronically conductive material are utilized to support and collect current from the active material paste. Once the paste is spread onto the plate, it is held in position by the fibrous interconnecting matrix represented by the polymeric binder. It is immaterial whether the paste contains water or not at the time it is spread onto the current collector or support.

In forming zinc electrodes in which the rechargeable active material is particulate zinc metal particles I have noticed that after removal of the surfactant spreading the paste is quite difficult to accomplish. This is attributable to a general lack of lubricity of the remaining paste. Lubricity, of course, is no problem if the surfactant is maintained in the paste at the time of spreading, since surfactants are inherently slippery. It is preferred, however, to avoid rinsing the cell plates after the active material has been spread, since erosion of the active material may occur unless rinsing is undertaken with considerable care.

For this reason I prefer to impart lubricity to the paste comprised of zinc and polymeric binder by amalgamating the zinc particles with a small quantity of mercury. Usually no more than 3 percent by weight of mercury based on the weight of zinc is required in order to impart satisfactory lubricity. While a variety of amalgamating techniques are known to the art, one which I prefer to use is to precipitate mercury on the surface of the zinc particles by immersing the particles in a mercury salt solution in which zinc spontaneously replaces mercury in solution.

It is recognized that zinc electrodes may be made using zinc oxide particles rather than zinc particles. I have noted that zinc oxide particles do not suffer from lack of lubricity when incorporated in a paste according to my invention. It is accordingly countenanced that another feasible technique to render spreadable a zinc metal particle containing paste is to mix in a minor amount of zinc oxide. Since I consider electrodes formed of zinc metal particles to be superior to those formed of zinc oxide particles, it is usually desired to maintain the proportion of zinc oxide particles in the minimum effective range—i.e. from about 3 to 10 percent by weight, based upon the weight of zinc metal particles. It is, of course, recognized that amalgamation with mercury and the incorporation of zinc oxide may be utilized in combination in a zinc containing electrode in order to impart the desired degree of lubricity.

While the above forming process is described with reference to the formation of a so-called pasted electrode structure, it is recognized that my invention may be applied to an otherwise fully formed rechargeable electrode that is not of the pasted type. For example, it is conventional practice to form rechargeable electrodes by chemically or electrically (as by electrodeposition or electrophoresis) depositing a finely divided active rechargeable electrode material onto a current collector, such as a screen, a sintered metal plaque, foam metal, etc. My invention may be applied to such rechargeable electrodes merely by impregnating the electrode with a liquid dispersion of the fluorocarbon polymer. In this instance the choice of ingredients is exactly the same as far as carrier, surfactant, and polymer are concerned, except that it may be convenient to utilize a somewhat larger proportion of carrier to decrease the viscosity of the dispersion and to increase its ability to penetrate the preformed electrode. Any conventional technique that has been employed to impregnate fuel cell electrodes with fluorocarbon polymer may be employed. I have found vacuum impregnation to be particularly suitable for achieving uniform impregnation. If desired, multiple impregnation may be undertaken with intermediate breaking of the dispersion according to my teachings in order to build up the desired fluorocarbon polymer loading. Generally it is preferred that the same proportion of fluorocarbon to active material be present as in the formation of a pasted electrode, except that since the electrode is a coherent body prior to introduction of the fluorocarbon polymer, there is no criticality to the minimum proportion of fluorocarbon polymer present so far as binding is concerned. As is more fully disclosed below the primary advantage associated with the introduction of fluorocarbon polymer into an otherwise cohesive rechargeable electrode relates to the hydrophobicity of the fluorocarbon polymer.

The salutory effect of my process is to produce an electrode in which the particulate active material is highly and uniformly available. This is attributable to the formation of an intimately interwoven and multiply interconnected matrix of fibrous fluorocarbon polymer. The fibrous character of the polymer facilitates binding the cell plate into a coherent whole without masking the particles of rechargeable active material. Polymers heretofore employed as binders in pasted electrodes have suffered the disadvantages of water solubility (polyalkylene oxides, polyvinylpyrrilidone, etc.) or the inherent inability to form fibrous linkages upon precipitation (polyethylene, polypropylene, etc.). While the fibrous fluorocarbon polymers which I use have been widely incorporated as binders in pasted electrodes, such as fuel cell electrodes, these materials previously have been invariably sintered before use. It is my recognition that sintering has the adverse effect of causing the fibrous strands of fluorocarbon polymer to coalesce into thin, discontinuous films that mask large areas of the active rechargeable material from contact with electrolyte. Conventionally, sintering of fluorocarbon polymer bonded electrodes has been considered essential to volatilize any surfactants present and to "set" the polymeric material in a non-tacky form. I have discovered that a rechargeable electrode can be formed which does not require sintering in order to be surfactant free and which possesses adequate coherence without sintering of the polymer. Most importantly, the electrodes formed according to my invention exhibit greater capacity and longer life. Further, my invention makes fluorocarbon polymer binders applicable with heat sensitive active electrode materials, such as cadmium, mercuric oxide, etc., for the first time.

A still further and unexpected advantage of electrodes formed according to my invention is that they possess a high capacity for consumption of gas produced by electrolysis on overcharge of a sealed cell. As is well understood, when a cell having an aqueous electrolyte goes into overcharge, water is electrolyzed to generate hydrogen and oxygen at the negative and positive electrodes respectively. In conventional sealed cell constructions the negative electrode is provided with excess plate capacity so that on overcharge only oxygen is produced. The oxygen so produced recombines at the negative electrode tending to discharge the negative electrode and preventing it from reaching full charge. The maximum rate at which the oxygen evolved can be recombined at the negative electrode controls the maximum permissible overcharge rate of a sealed cell, since otherwise oxygen will accumulate within the cell and cause unsafe pressure levels to be reached.

I have discovered that when negative rechargeable electrodes are formed according to my teachings using a fluorocarbon polymer either as a binder or simply as an impregnant, as in the case of non-pasted electrodes, the maximum rate of overcharge can be increased without unsafely pressuring a sealed cell. This is surprising since the fibrous form of the polymer permits maximum contact of the active particles with the electrolyte and hence maximum availability. Nevertheless, the high degree of hydrophobicity of the fluorocarbon polymers at the same time renders the active material also highly assessible to gas present within a sealed cell during overcharge. As is generally appreciated, the cells perform best in recombining evolved gas when the separator is electrolyte starved--that is, contains some pores that are not entirely filled with electrolyte.

My invention may be more fully appreciated by reference to the following examples:

EXAMPLE 1

Four hundred eighty grams of finely divided zinc powder were weighed out, placed into a beaker, and mixed with 13 grams of mercuric oxide. To this was added an aqueous dispersion containing 35.7 ml of "Teflon-30" and 100 grams of water. "Teflon-30" is a trademarked designation for a commercially available aqueous dispersion of PTFE in water formed of 60 percent by weight colloidally dispersed PTFE, water, and 5 percent by weight octyl phenol polyethylene oxide detergent.

To break the PTFE dispersion, the mixture was heated to 200°F and maintained at that temperature until the water was evaporated. The dispersion having been irreversibly broken, water was subsequently blended into the mixture and decanted to extract the detergent. On the fourth rinsing in this manner no further foam was noted during decantation, thus indicating that the detergent had been removed.

A portion of the zinc and PTFE was spread onto a rectangular expanded copper current collector 6 × 5-½ inches on a side. The pasted current collector was allowed to dry at room temperature and then subjected to pressing at 0.4 ton per square inch to form an electrode having an average thickness of 60 mils.

To test the performance of the electrode so formed a conventional nickel counter electrode was employed having the same geometric dimensions as the zinc electrode. The nickel electrode was formed of a nickel plaque impregnated with nickel hydroxide. Both the nickel and zinc electrodes were placed in nonwoven nylon bags, and three layers of cellophane were placed between the bags. The electrodes were mounted with a spacing of 10 mils therebetween and with the active area immersed in 20 percent by weight potassium hydroxide electrolyte.

A testing regimen of 16 hours charge at two amperes alternating with five hours discharge at five amperes was employed. The cell exhibited an open circuit voltage of 1.76 volts and a potential of 1.70 volts when initially placed on discharge. After 50 cycles the cell continued to perform satisfactorily. No shorts were observed. Shape change was significantly retarded. The zinc electrode retained from 70 to 75 percent of its original capacity.

EXAMPLE 2

The procedure of Example 1 was repeated, except that the zinc powder was mercury amalgamated prior to mixing with PTFE and water. No significant variation of electrode performance was observed as compared with the results of the Example 1 operation.

EXAMPLE 3

The procedure of Example 1 was repeated, except that the starting materials were changed to 95 grams of cadmium oxide in powder form, 5 grams of carbonyl nickel powder, and 5 grams of "Teflon-30" with the addition of water being maintained at 15.0 grams. After 300 cycles the electrode still performed well with better than 60% utilization of active material. The voltage on discharge remained constant at 1.25 volts. No shorts or excessive cadmium migration was observed.

EXAMPLE 4

The procedure of Example 1 was repeated, except that the starting materials were changed to 85 grams mercuric oxide, 10 grams of graphite, and 5 grams of PTFE with the addition of water being maintained at 15.0 grams. A conventional cadmium electrode was utilized as a counter electrode formed by impregnating a sintered nickel plaque with cadmium hydroxide. The cadmium electrode was the same size as the mercury electrode. The initial discharge voltage was 0.9 volt. After 10 cycles the cell continued to operate successfully, retaining 80 percent of its initial capacity.

EXAMPLE 5

The procedure of Example 4 was repeated, except that the starting materials were changed to 200 grams of nickel hydroxide, 50 grams of carbonyl nickel powder, and 25 grams of PTFE with the addition of water being maintained at 15 grams. The cell exhibited a potential of 1.25 volts on discharge. After 10 cycles of operation the cell exhibited no capacity or voltage loss.

EXAMPLE 6

The procedure of Example 4 was repeated, except that the starting materials were changed to 95 grams of silver powder and 5 grams of PTFE with the addition of water being maintained at 15 grams. The cell exhibited a potential on discharge of 1.1 volts. From 90 to 95 percent of the electrode capacity was available for use and there was no loss of capacity after 10 cycles of operation.

EXAMPLE 7

The procedure of Example 6 was repeated, except that silver oxide was substituted for silver as a starting material. The results of cell testing were not significantly different.

EXAMPLE 8

The procedure of Example 1 was repeated, except that the starting materials were changed to 95 grams of cupric oxide and 5 grams of PTFE with the addition of water being maintained at 15 grams. A zinc plate having the same dimensions as the electrode under test was employed as a counter electrode. The cell exhibited a potential of 0.65 volt on discharge and after 10 cycles of operation retained 30 percent of its original capacity.

EXAMPLE 9

The procedure of Example 1 was repeated, except that the PTFE was removed from the dispersion by heating rather than rinsing. The original mix was spread onto the current collector and allowed to stand in air for 2 hours at room temperature. Thereafter the electrode was heated to 500°F until after five minutes at temperature it was noted that no more white smoke issued from the electrode. The 500°F temperature was chosen to be below the sintering temperature of PTFE but above the thermal decomposition temperature of the detergent. The termination of smoke generation indicated that all of the detergent had been volatilized and driven off. Performance during cycling did not vary significantly from that observed in Example 1.

EXAMPLE 10

The procedure of Example 1 was repeated, except that the detergent was removed by sintering the PTFE according to conventional practice. After the original mix was spread on the current collector, it was allowed to dry. Thereafter the electrode was wrapped in aluminum foil and placed between two stainless steel sheets. This assembly was heated to 617°F to sinter the PTFE and remove the detergent and held at this temperature for 25 minutes. The electrode so formed was clearly inferior to that formed and operated in Example 1, since only 13 cycles were obtained prior to shorting.

EXAMPLE 11

A number of sealed nickel-cadmium cells each having a 2.0 amp-hr capacity were formed and fitted with pressure gauges. A portion of the nickel-cadmium cells were formed according to conventional procedures, while the remainder were provided with negative cadmium electrodes prepared according to my invention. In all cells the electrodes were formed using a sintered nickel plaque to form the electrodes. The positive electrodes were each identically formed by loading the plaque with active nickel. The negative electrodes in each instance contained roughly equal proportions by weight of nickel plaque and cadmium hydroxide. The porosity of the negative electrodes was 30 percent. The negative electrodes formed according to my invention were prepared by submerging cadmium hydroxide loaded plaques in an aqueous dispersion containing 30 percent by weight PTFE, based on the total weight of the dispersion. While the plaques were submerged, a vacuum was drawn at the surface of the dispersion. The vacuum was maintained for five minutes, then broken, and the procedure repeated. The impregnated electrodes were removed from the dispersion and dried at 120°F. Thereafter the electrodes were rinsed four times in isopropyl alcohol to remove surfactant and redried at 120°F. When subjected to overcharge at 0.5 ampere the cells having negative cadmium electrodes formed according to my invention exhibited a pressurization of only 22.5 psia, where the control cells having conventionally prepared, but otherwise comparable negative electrodes exhibited an internal pressurization of 73.0 psia. This demonstrated the superior oxygen recombination properties of electrodes prepared according to my invention.

While I have described my invention with reference to certain preferred embodiments, it is appreciated that numerous variations of an obvious character will readily occur to those skilled in the art. It is accordingly intended that the scope of my invention be determined with reference to the following claims.

What I claim and desire to secure by Letters Patent of the United States is:

1. A rechargeable electrolytic cell having enhanced gas recombination, capacity and cycle life, said cell comprising:
   a positive electrode;
   a negative electrode;
   a separator;
   an electrolyte; and
   one of said electrodes comprising:
      a foraminous, electrically conductive, substrate;
      a paste supported by said substrate, said paste comprising:
         a finely divided, particulate, rechargeable, active material; and
         a fibrous interconnecting network of an unsintered, uncoalesced, hydrophobic linear fluorocarbon polymer, said active material dispersed throughout and bound in said network and being highly accessible to said electrolyte and to gas being generated during overcharge of the cell.

2. The cell of claim 1 wherein said polymer forms between 0.5 and 25% by weight of the combined weight of said polymer and said active material.

3. The cell of claim 1 wherein said cell further comprises a sealed container, said electrodes, separator, and electrolyte disposed in said container.

4. The cell of claim 2 wherein said separator is electrolyte starved.

5. The cell of claim 2 wherein said positive and negative electrodes comprise active nickel and cadmium materials, respectively.

6. A rechargeable cell comprising positive and negative electrodes, at least one of said electrodes comprising:
   a a sintered porous plaque of bonded metallic powder;
   b an active material dispersed in the pores of said plaque; and
   c an unsintered, hydrophobic, fibrous, linear fluorocarbon polymer dispersed in the pores of said plaque.

7. The cell of claim 6 wherein said active material is cadmium.

8. The cell of claim 6 wherein said polymer is polytetrafluoroethylene.

9. The cell of claim 6 wherein said powder is comprised of nickel.

* * * * *

UNITED STATES PATENT OFFICE
CERTIFICATE OF CORRECTION

PATENT NO. : 3,954,501
DATED : May 4, 1976
INVENTOR(S) : Guy Rampel

It is certified that error appears in the above-identified patent and that said Letters Patent are hereby corrected as shown below:

On the title page, column 1, insert -- Assignee: General Electric Company, Columbus, Ohio.

Signed and Sealed this

Twenty-sixth Day of October 1976

[SEAL]

Attest:

RUTH C. MASON
*Attesting Officer*

C. MARSHALL DANN
*Commissioner of Patents and Trademarks*